United States Patent
Ozawa et al.

(10) Patent No.: US 12,286,381 B2
(45) Date of Patent: Apr. 29, 2025

(54) COIL COMPONENT AND METHOD FOR MANUFACTURING COIL COMPONENT

(71) Applicant: Murata Manufacturing Co., Ltd., Kyoto-fu (JP)

(72) Inventors: Reiji Ozawa, Nagaokakyo (JP); Ayumi Yamamoto, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 18/741,025

(22) Filed: Jun. 12, 2024

(65) Prior Publication Data

US 2024/0327307 A1  Oct. 3, 2024

Related U.S. Application Data

(62) Division of application No. 17/230,806, filed on Apr. 14, 2021, now Pat. No. 12,049,430.

(30) Foreign Application Priority Data

Apr. 20, 2020 (JP) ................. 2020-074727

(51) Int. Cl.
| | |
|---|---|
| *H01F 27/29* | (2006.01) |
| *C04B 37/00* | (2006.01) |
| *C04B 41/00* | (2006.01) |
| *C04B 41/48* | (2006.01) |
| *C04B 41/83* | (2006.01) |

(Continued)

(52) U.S. Cl.
CPC .......... *C04B 41/009* (2013.01); *C04B 37/003* (2013.01); *C04B 41/4853* (2013.01); *C04B 41/83* (2013.01); *H01F 27/2804* (2013.01); *H01F 27/29* (2013.01); *H01F 27/327* (2013.01); *H01F 41/041* (2013.01); *C04B 2237/125* (2013.01); *C04B 2237/34* (2013.01); *C04B 2237/62* (2013.01); *H01F 2027/2809* (2013.01)

(58) Field of Classification Search
CPC .... H01F 27/2804; H01F 27/29; H01F 27/327; H01F 41/041; H01F 2027/2809
See application file for complete search history.

(56) References Cited

U.S. PATENT DOCUMENTS

| | | | |
|---|---|---|---|
| 5,324,767 A * | 6/1994 | Koyama | H02K 15/12 |
| | | | 523/444 |
| 6,191,675 B1 | 2/2001 | Sudo et al. | |

(Continued)

FOREIGN PATENT DOCUMENTS

| | | |
|---|---|---|
| CN | 1448968 A | 10/2003 |
| JP | H11307359 A * | 11/1999 |

(Continued)

*Primary Examiner* — Malcolm Barnes
(74) *Attorney, Agent, or Firm* — Studebaker Brackett PLLC

(57) ABSTRACT

A coil component includes a porous ceramic portion having pores, a coil portion embedded in the porous ceramic portion, and outer electrodes which are provided on an outer surface of the porous ceramic portion and electrically connected to the coil portion. The porous ceramic portion has a porosity of 10% by volume or more and 90% by volume or less (i.e., from 10% by volume to 90% by volume), and the pores are filled with a cured product of a resin composition containing a cycloaliphatic epoxy resin and an acid anhydride-based curing agent.

3 Claims, 3 Drawing Sheets

(51) Int. Cl.
*H01F 27/28* (2006.01)
*H01F 27/32* (2006.01)
*H01F 41/04* (2006.01)

(56) References Cited

U.S. PATENT DOCUMENTS

2003/0214793 A1* 11/2003 Uchida ............... H01F 17/0013
361/761
2016/0113113 A1* 4/2016 Sethumadhavan ..... H01F 1/348
156/154

FOREIGN PATENT DOCUMENTS

| JP | 2004-146801 A | 5/2004 |
| JP | 2004-297020 A | 10/2004 |
| JP | 2005-32995 A | 2/2005 |
| JP | 2005-051195 A | 2/2005 |
| JP | 2015-063629 A | 4/2015 |
| JP | 2016-033197 A | 3/2016 |
| JP | 2016-079300 A | 5/2016 |

* cited by examiner

COIL COMPONENT AND METHOD FOR MANUFACTURING COIL COMPONENT

CROSS-REFERENCE TO RELATED APPLICATION

This application is a Divisional of U.S. patent application Ser. No. 17/230,806 filed on Apr. 14, 2021, which claims benefit of priority to Japanese Patent Application No. 2020-074727, filed Apr. 20, 2020, the entire content of which is incorporated herein by reference.

BACKGROUND

Technical Field

The present disclosure relates to a coil component and a method for manufacturing a coil component.

Background Art

As a ferrite material with low dielectric constant used for electromagnetic wave absorbers and the like, a sintered body of ferrite foam having a porosity of 20 to 70% by volume is known. In a coil including such a sintered body of ferrite foam containing pores, even when a direct current is superimposed, the self-resonant frequency does not change, but the impedance greatly decreases, which causes a problem.

Thus, as a multilayer ceramic electronic component in which even when a small direct current is superimposed, the self-resonant frequency hardly changes and the rate of decrease in impedance can be suppressed, there has been proposed a multilayer ceramic electronic component including a ceramic base body having pores, in which 40% by volume or more of the volume of the pores are filled with a resin, as described, for example, in Japanese Unexamined Patent Application Publication No. 2005-32995.

However, the strength of the electronic component including a ceramic base body having pores filled with a resin depends on the strength of the resin filled in the pores. Therefore, when the electronic component is exposed to high-temperature environment for a long time, resulting in a decrease in the strength of the resin, the electronic component cannot maintain the desired strength.

SUMMARY

Accordingly, the present disclosure provides a coil component in which a decrease in strength can be suppressed even when exposed to high temperatures for a long time.

According to preferred embodiments of the present disclosure, a coil component includes a porous ceramic portion having pores, a coil portion embedded in the porous ceramic portion, and outer electrodes which are provided on an outer surface of the porous ceramic portion and electrically connected to the coil portion. The porous ceramic portion has a porosity of 10% by volume or more and 90% by volume or less (i.e., from 10% by volume to 90% by volume), and the pores are filled with a cured product of a resin composition containing a cycloaliphatic epoxy resin and an acid anhydride-based curing agent.

According to preferred embodiments of the present disclosure, a method for manufacturing a coil component includes a step of preparing ceramic green sheets containing a ceramic material and a vanishing material, a step of forming interconnection layers on the ceramic green sheets, a step of stacking the ceramic green sheets having the interconnection layers formed thereon to produce a green multilayer body, a step of firing the green multilayer body and eliminating the vanishing material to produce a multilayer body including a porous ceramic portion having pores, and a step of filling the pores of the porous ceramic portion with a resin composition containing a cycloaliphatic epoxy resin and an acid anhydride-based curing agent.

The present disclosure can provide a coil component in which a decrease in strength can be suppressed even when exposed to high temperatures for a long time.

Other features, elements, characteristics and advantages of the present disclosure will become more apparent from the following detailed description of preferred embodiments of the present disclosure with reference to the attached drawings.

DETAILED DESCRIPTION

A coil component and a method for manufacturing a coil component according to preferred embodiments of the present disclosure will be described below.

However, the present disclosure is not limited to the structures and embodiments described below, and can be appropriately changed within a range that does not depart from the spirit and scope of the present disclosure. Note that a combination of two or more preferred structures and embodiments of the present disclosure described below is also covered by the present disclosure.

<Coil Component>

A coil component according to an embodiment of the present disclosure includes a porous ceramic portion having a coil portion embedded therein, which is obtained by stacking ceramic green sheets having interconnection layers formed thereon, followed by firing. In particular, the porous ceramic portion has pores, and the pores are filled with a cured product of a resin composition containing a cycloaliphatic epoxy resin and an acid anhydride-based curing agent.

Figure 1:
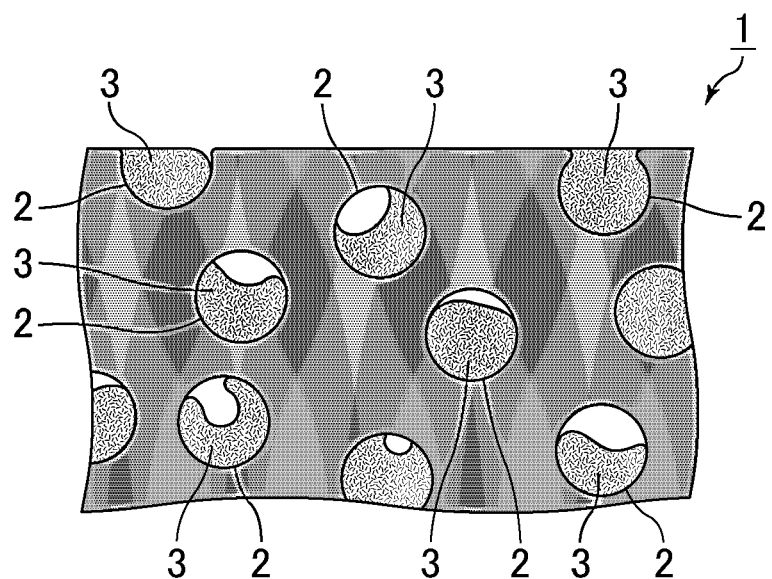
FIG. 1 is a cross-sectional view schematically showing an internal structure of a porous ceramic portion.

First, description will be made on the porous ceramic portion with reference to FIG. 1. FIG. 1 is a cross-sectional view schematically showing an internal structure of a porous ceramic portion. As shown in FIG. 1, pores 2 are formed inside and on the surface of a porous ceramic portion 1, and the pores 2 are filled with a cured product of a resin composition 3. The pores 2 have an average pore diameter of preferably about 1 μm or more and about 10 μm or less (i.e., from about 1 μm to about 10 μm), and more preferably about 2 μm or more and about 6 μm or less 9 (i.e., from about 2 μm or more and about 6 μm). The average pore diameter can be measured by SEM (electron microscope) observation.

The porous ceramic portion has a porosity of about 10% by volume or more and about 90% by volume or less (i.e., from 10% by volume to about 90% by volume). When the porosity is less than about 10% by volume, the dielectric constant of the porous ceramic portion does not sufficiently decrease. When the porosity is more than about 90% by volume, it is difficult to produce a porous ceramic portion. Preferably, the porosity is about 10% by volume or more and about 50% by volume or less (i.e., from about 10% by volume to about 50% by volume). The porosity can be calculated by the method described later in Examples.

As the ceramic material constituting the porous ceramic portion, a magnetic material such as a ferrite material, a non-magnetic material such as a glass-ceramic material, or a composite material obtained by mixing the magnetic material and the non-magnetic material can be used.

As the ceramic material, a ferrite material is preferable, and a Ni—Zn—Cu-based ferrite material is particularly preferable.

In the coil component according to the embodiment of the present disclosure, the pores of the porous ceramic portion are filled with a cured product of a resin composition containing a cycloaliphatic epoxy resin and an acid anhydride-based curing agent.

As the cycloaliphatic epoxy resin, for example, a cycloalkene oxide type may be used. Specific examples thereof include 3',4'-epoxycyclohexylmethyl-3,4-epoxycyclohexanecarboxylate, bicyclohexyl-3,3'-diepoxide, 3,4:7,8-diepoxybicyclo[4.3.0]nonane, 4,5:10,11-diepoxytetracyclo[6.5.1.0$^{2,7}$.0$^{6,13}$]tetradecane, and 4,5:10,11-diepoxypentacyclo[6.5.1.1$^{3,6}$.0$^{2,7}$.0$^{9,13}$]pentadecane. These cycloaliphatic epoxy resins may be used alone or in mixture of two or more.

As the cycloaliphatic epoxy resin, 3',4'-epoxycyclohexylmethyl-3,4-epoxycyclohexanecarboxylate is preferable.

The content of the cycloaliphatic epoxy resin in the resin composition is preferably about 35% by weight or more and about 55% by weight or less (i.e., from about 35% by weight to about 55% by weight) relative to the total of the cycloaliphatic epoxy resin and the acid anhydride-based curing agent.

The resin composition may contain an epoxy resin other than the cycloaliphatic epoxy resin. Examples of the other epoxy resin include a bisphenol A-type epoxy resin, a bisphenol F-type epoxy resin, and a hydrogenated bisphenol A-type epoxy resin.

In the case where the other epoxy resin is used, the ratio of the cycloaliphatic epoxy resin to the total weight of the cycloaliphatic epoxy resin and the other epoxy resin is preferably about 25% by weight or more and about 75% by weight or less (i.e., from about 25% by weight to about 75% by weight).

As the acid anhydride-based curing agent, for example, at least one selected from the group consisting of methyltetrahydrophthalic anhydride, methyl endomethylene tetrahydrophthalic anhydride, methylbutenyltetrahydrophthalic anhydride, dodecenylsuccinic anhydride, methylhexahydrophthalic anhydride, and hexahydrophthalic anhydride is preferably used. More preferably, a mixture of methylhexahydrophthalic anhydride and hexahydrophthalic anhydride is used.

The content of the acid anhydride-based curing agent in the resin composition is preferably about 45% by weight or more and about 65% by weight or less (i.e., from about 45% by weight to about 65% by weight) relative to the total of the cycloaliphatic epoxy resin and the acid anhydride-based curing agent.

The resin composition may be further incorporated with a curing accelerator, an antioxidant, a polymerization initiator, a plasticizer, an antistatic agent, a flame retardant, an antifoaming agent, a viscosity-adjusting agent, and the like.

The cured product of a resin composition containing a cycloaliphatic epoxy resin and an acid anhydride-based curing agent has a high glass-transition temperature and high heat resistance. Therefore, when the cured product of a resin composition containing a cycloaliphatic epoxy resin and an acid anhydride-based curing agent is used as the resin to be filled in the pores, a decrease in the strength of the coil component can be suppressed when exposed to high temperatures.

In the coil component according to the embodiment of the present disclosure, preferably, the cured product has a glass-transition temperature (Tg) of about 200° C. or higher. When the Tg is lower than about 200° C., there is a concern that strength may become insufficient when the coil component is exposed to high temperatures for a long time. More preferably, the Tg is about 200° C. or higher and about 300° C. or lower (i.e., from about 200° C. to about 300° C.). The Tg of the cured product is a value measured in accordance with JIS K7121.

In the coil component according to the embodiment of the present disclosure, the filling factor of the cured product for the volume of the pores is preferably about 30% by volume or more. When the filling factor is less than about 30% by volume, there is a concern that the flexural strength of the coil component may be deteriorated. More preferably, the filling factor is about 40% by volume or more and about 90% by volume or less (i.e., from about 40% by volume to about 90% by volume).

The filling factor of the cured product of a resin composition for the volume of the pores can be calculated by the following method.

The volume of the cured product filled is calculated from a change in weight of the porous ceramic portion before and after filling of the resin composition and the specific gravity of the cured product. Next, the volume of the porous ceramic portion is calculated from dimensions measured by a micrometer, and by multiplying the resulting volume by the porosity, the volume of the pores in the porous ceramic portion is obtained. The value obtained by dividing the volume of the cured product by the volume of the pores is defined as a filling factor of the cured product for the volume of the pores (% by volume).

Filling factor of cured product (% by volume)=[(volume of cured product)/(volume of pores)]×100

Note that the volume of the cured product filled can also be determined from the weight loss ratio of the coil component as a finished article obtained by TG-DTA and the density of the cured product.

Next, an example of a structure of a coil component according to an embodiment of the present disclosure will be described with reference to FIGS. 2 and 3.

Figure 2:
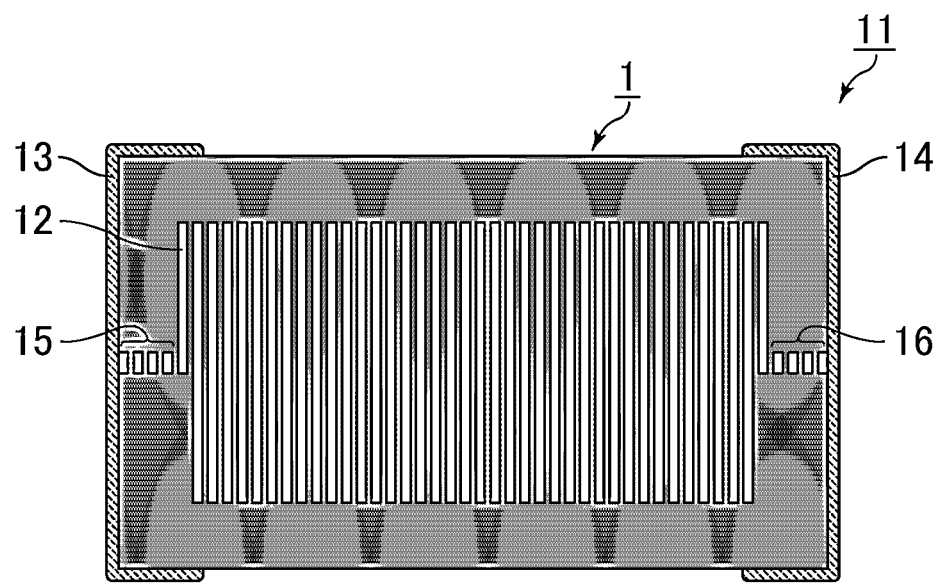
FIG. 2 is a side cross-sectional view schematically showing an example of an internal structure of a coil component including a porous ceramic portion.

FIG. 2 is a side cross-sectional view schematically showing an example of an internal structure of a coil component including a porous ceramic portion.

Figure 3:
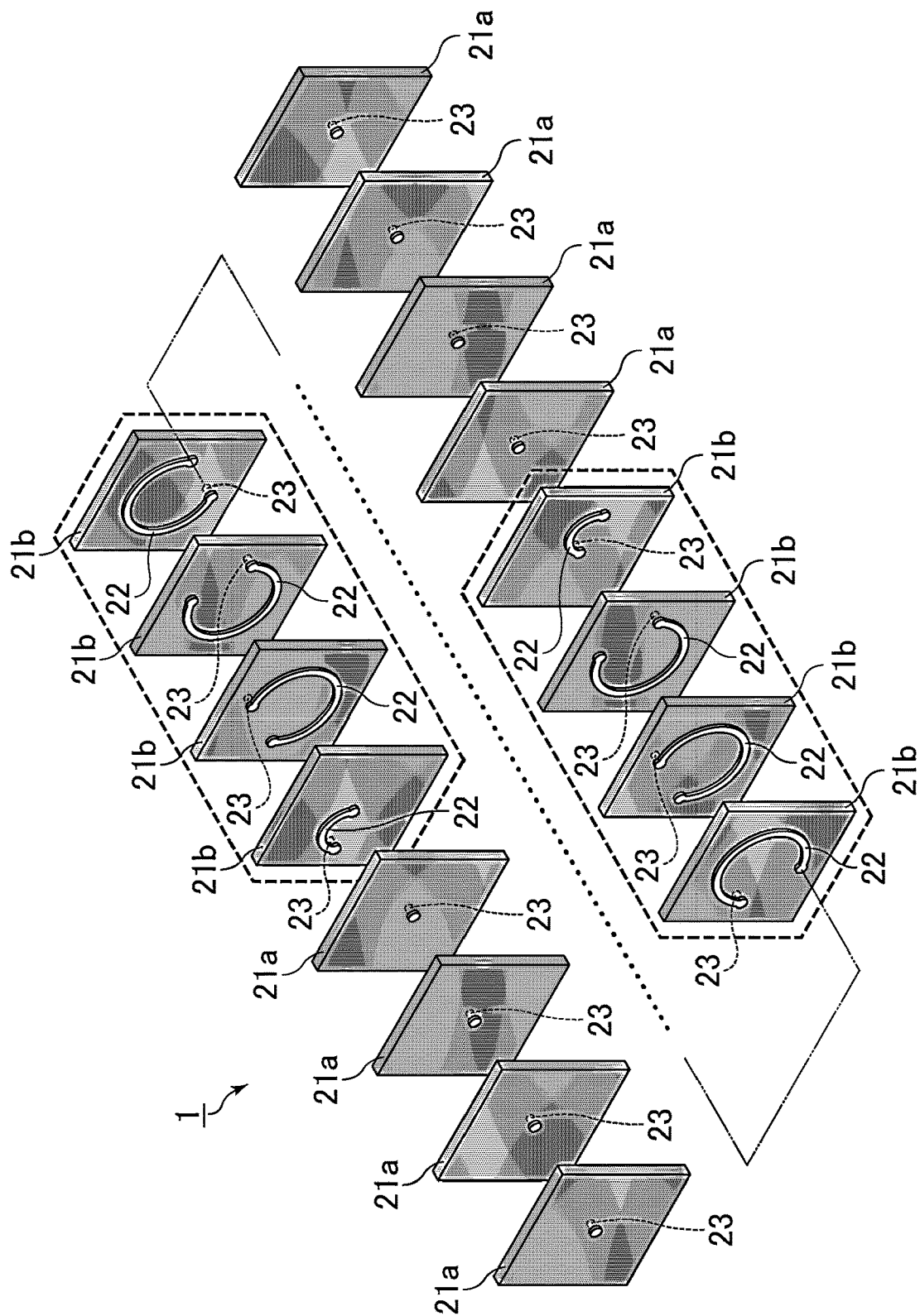
FIG. 3 is an exploded perspective view schematically showing an example of a multilayer body constituting the coil component shown in FIG. 2.

FIG. 3 is an exploded perspective view schematically showing an example of a multilayer body constituting the coil component shown in FIG. 2.

As shown in FIG. 2, a coil component 11 has a structure in which a coil portion 12 is embedded in a porous ceramic portion 1, and outer electrodes 13 and 14 are provided on an outer surface of the porous ceramic portion 1. The outer electrodes 13 and 14 are electrically connected to the coil portion 12 through via portions 15 and 16, respectively.

FIG. 2 is a side view schematically showing an example of the internal structure of the porous ceramic portion 1 constituting the coil component 11, in which the actual shapes, connections, etc. are not exactly shown. As will be described later with reference to FIG. 3, coil conductors 22 constituting the coil portion 12 are connected through via conductors 23, and the via conductors 23 are connected to one another.

As shown in FIG. 3, the porous ceramic portion 1 has a structure in which porous ceramic sheets 21a and porous ceramic sheets 21b are stacked together. Each of the porous ceramic sheets 21a is provided with a via conductor 23. Each of the porous ceramic sheets 21b is provided with a coil conductor 22 and a via conductor 23. The coil conductors 22 and the via conductors 23 are stacked together along with the porous ceramic sheets 21a and the porous ceramic sheets 21b.

<Method for Manufacturing Coil Component>

Next, a method for manufacturing a coil component will be described. The method for manufacturing a coil component also corresponds to a method for manufacturing the coil component according to the embodiment of the present disclosure.

First, description will be made on an embodiment of a step of preparing ceramic green sheets containing a ceramic material and a vanishing material.

As the ceramic material, for example, a magnetic material such as a ferrite material, a non-magnetic material such as a glass-ceramic material, or a composite material obtained by mixing the magnetic material and the non-magnetic material can be used. In the manufacturing method according to the embodiment of the present disclosure, a ferrite material is preferable as the ceramic material. As the ferrite material, for example, a Ni—Zn—Cu-based ferrite material (oxide mixed powder) can be obtained by wet-mixing oxides of iron, nickel, zinc, and copper and performing pulverization with a ball mill or the like, followed by drying and calcining.

The vanishing material is not particularly limited as long as it is eliminated from the porous ceramic portion by firing. However, it is preferable to use a spherical polymer having a large surface area, high shape retention, and excellent adhesion to a binder. The use of such a spherical polymer can decrease the proportion of the binder and increase the proportion of the vanishing material. As the vanishing material, for example, resin balls having an average particle diameter of about 1 μm or more and about 10 μm or less (i.e., from about 1 μm to about 10 μm) are preferable. The average particle diameter of the vanishing material is more preferably about 4 μm or more and about 6 μm or less (i.e., from about 4 μm to about 6 μm). The vanishing material is, for example, composed of crosslinked polymethyl methacrylate, polystyrene, polyethylene, polypropylene, or the like. Crosslinked polymethyl methacrylate is preferable.

A binder, an organic solvent, a dispersant, and the like are added to the ceramic material and the vanishing material, and mixing is performed. By forming the resulting mixture into sheets with a predetermined thickness using a doctor blade process or the like, ceramic green sheets can be obtained. The amount of the vanishing material mixed is adjusted such that the porous ceramic portion has a desired porosity.

Next, description will be made on an embodiment of a step of forming interconnection layers on the ceramic green sheets.

As will be described later, by stacking the ceramic green sheets having the interconnection layers formed thereon, followed by firing, the interconnection layers constitute a coil portion and via portions in a coil component.

First, via-holes are formed by laser beam machining at predetermined points of the ceramic green sheets containing the ceramic material and the vanishing material obtained in the step described above. By applying a conductive paste such as a Ag paste onto the ceramic green sheets having the via-holes, the via-holes are filled with the conductive paste. This conductive paste forms via conductors. Furthermore, a conductive paste for forming a conductive pattern for winding with a predetermined shape is applied onto certain ceramic green sheets. This conductive paste forms coil conductors. By drying the ceramic green sheets having the conductive paste applied thereonto, interconnection layers can be formed on the ceramic green sheets.

Next, description will be made on an embodiment of a step of stacking the ceramic green sheets having the interconnection layers formed thereon to produce a green multilayer body.

The ceramic green sheets having coil conductors and via conductors are stacked together such that a coil portion having a winding axis parallel to the mounting surface after singulation is formed inside a multilayer body. The ceramic green sheets having via conductors for forming via portions are further stacked on the upper and lower sides, followed by pressure bonding. Then, by cutting to singulate the pressure-bonded body so as to have a predetermined size, a plurality of green multilayer bodies each having the predetermined size can be produced.

A step of firing the green multilayer body and eliminating the vanishing material to produce a multilayer body including a porous ceramic portion having pores can be performed by firing the singulated green multilayer body at a predetermined temperature for a predetermined time. The vanishing material contained in the ceramic green sheets is eliminated by firing, and pores are formed with a shape that substantially follows the shape of portions in which the vanishing material has existed.

Next, description will be made on an embodiment of a step of filling the pores of the porous ceramic portion with a resin composition containing a cycloaliphatic epoxy resin and an acid anhydride-based curing agent.

First, a resin composition containing a cycloaliphatic epoxy resin and an acid anhydride-based curing agent is prepared. As the cycloaliphatic epoxy resin and the acid anhydride-based curing agent, the same materials as those described above with respect to the coil component can be used. In addition to the cycloaliphatic epoxy resin and the acid anhydride-based curing agent, the resin composition may be incorporated with the other epoxy resin described above, a curing accelerator, an antioxidant, a polymerization initiator, a plasticizer, an antistatic agent, a flame retardant, an antifoaming agent, a viscosity-adjusting agent, and the like.

The multilayer body that has been fired is immersed in the resin composition for a predetermined time, and thereby, the pores of the porous ceramic portion are filled with the resin composition. The immersion is preferably performed under reduced pressure or in vacuum. By changing the immersion time in the resin composition, the filling factor of the resin composition for the pores can be adjusted.

After the step of filling the pores of the porous ceramic portion with the resin composition, the multilayer body is subjected to heat treatment to cure the resin composition filled in the pores 2. The heat treatment can be performed, for example, at about 190° C. or higher and about 250° C. or lower (i.e., from about 190° C. to about 250° C.) for about 0.5 hours or more and about 24 hours or less (i.e., from about 0.5 hours to about 24 hours), and preferably at about 200° C. or higher and about 250° C. or lower (i.e., from about 200° C. to about 250° C.).

The method for forming outer electrodes is not particularly limited, and a known formation method can be used. For example, (1) a method in which a conductive paste is applied onto an outer surface of the fired multilayer body, and by baking the conductive paste, outer electrodes are formed, or (2) a method in which after the pores of the porous ceramic portion are filled with the resin composition, outer electrodes are formed on an outer surface of the porous ceramic portion may be preferably used.

In the method (1), specifically, first, for example, after a green multilayer body is subjected to degreasing treatment in the air under predetermined conditions, firing is performed at a predetermined temperature to produce a multilayer body. Then, a conductive paste containing conductive particles of Cu, Ni, Ag, or the like and a glass-ceramic material is applied onto an outer surface of the fired multilayer body by immersion, coating, or the like. Subsequently, the multilayer body having the conductive paste applied thereonto is subjected to baking treatment at a predetermined temperature. Thus, the conductive paste is baked to form underlying electrode layers that are connected to via portions. Subsequently, pores of the porous ceramic portion are filled with a resin composition, curing is performed, and then, a first plating layer formed by Ni plating and a second plating layer formed by Sn plating are disposed in this order on/above a surface of each of the underlying electrode layers, thereby forming outer electrodes.

In the method (2), specifically, first, as in the method (1), a fired multilayer body is produced. Then, pores of the porous ceramic portion are filled with a resin composition, and curing is performed. Subsequently, by applying a conductive paste containing conductive particles of Cu, Ni, Ag, or the like and a thermosetting resin by coating or the like, followed by curing, underlying electrode layers are formed. A first plating layer formed by Ni plating and a second plating layer formed by Sn plating are disposed in this order on/above a surface of each of the underlying electrode layers, thereby forming outer electrodes.

EXAMPLES

Examples which more specifically disclose the coil component according to the embodiments of the present disclosure and the method for manufacturing a coil component according to the embodiments of the present disclosure will be shown below. Note that the present disclosure is not limited to these examples.

The filling factor of the cured product of a resin composition for the volume of the pores was calculated by the calculation method described above.

<Porosity of Porous Ceramic Portion>

The porosity of the porous ceramic portion was calculated by the following method.

A ceramic green sheet containing a vanishing material was fired at 905° C. for 150 minutes to obtain a porous ceramic sheet. A cross section of the resulting porous ceramic sheet was formed using an ion milling device. A reflection electron image of the cross section of the porous ceramic sheet was obtained using an electron microscope. By subjecting the resulting reflection electron image to binarization processing with image analysis software "Win-ROOF", an area ratio of pores to the cross section of the porous ceramic sheet was calculated and defined as a porosity (% by volume) of the porous ceramic portion.

Examples 1 to 7

(Preparation of Ceramic Material)

Powders of $Fe_2O_3$, NiO, ZnO, and CuO were prepared and weighed so as to satisfy a predetermined composition ratio. The weighed materials were placed in a ball mill together with PSZ media, and wet mixing and pulverization were performed. A slurry was discharged from the ball mill, dried, and then calcined at 800° C. for 2 hours.

(Preparation of Ceramic Green Sheets)

The calcined material was incorporated with a predetermined amount of resin balls made of crosslinked polymethyl methacrylate (average particle diameter 5 μm, spherical polymer particles (Techpolymer) manufactured by Sekisui Kasei Co., Ltd.) and charged into a ball mill together with a polyvinyl butyral-based binder, ethanol and toluene serving as organic solvents, and PSZ balls, followed by mixing and pulverization. The resulting mixture was formed into sheets with a predetermined thickness using a doctor blade process, and the sheets were punched out to a predetermined size, thereby obtaining ceramic green sheets. The amount of the resin balls used was adjusted such that the fired porous ceramic had a porosity of 10% by volume (Example 1), 30% by volume (Examples 2 to 5), 50% by volume (Example 6), and 90% by volume (Example 7).

(Formation of Interconnection Layers and Production of Multilayer Body)

Next, the ceramic green sheets were irradiated with laser at predetermined points to form via-holes, and by applying a Ag paste, the via-holes were filled with the Ag paste, and also coil conductors were formed. The ceramic green sheets having the coil conductors formed thereon were stacked in a predetermined order, and the ceramic green sheets having via conductors applied thereon were stacked on the upper and lower sides, followed by pressure bonding, to thereby produce a green multilayer body block.

The green multilayer body block was singulated and fired at 900° C. for 2 hours to obtain a base body of a coil component. A Ag paste containing a glass component was applied onto end faces of the resulting base body, and by baking the Ag paste at 800° C., underlying electrode layers of outer electrodes were formed.

(Filling and Curing of Resin Composition)

Next, a resin composition containing 3',4'-epoxycyclohexylmethyl-3,4-epoxycyclohexanecarboxylate as a cycloaliphatic epoxy resin and a mixture of 4-methylhexahydrophthalic anhydride and hexahydrophthalic anhydride as an acid anhydride-based curing agent was prepared. The resin composition contained 45% by weight of the cycloaliphatic epoxy resin and 55% by weight of the acid anhydride-based curing agent. The base body provided with the underlying electrode layers was immersed in the resin composition for a predetermined time and retained in vacuum, and thereby, the pores were filled with the resin. Regarding the base bodies in which the porous ceramic portion had a porosity of 30% by volume, by changing the immersion time, samples having different filling factors of the resin composition were produced. After filling with the resin composition, heat treatment was performed at the maximum temperature of 200° C. to cure the filled resin.

After the resin was cured, a Ni plating layer and a Sn plating layer were disposed by electrolytic plating in this order on/above each of the underlying electrode layers to form outer electrodes. Thus, coil components of Examples 1 to 7 were obtained. Table 1 shows the porosity of the porous ceramic portion and the filling factor of the cured product in the resulting coil components.

Furthermore, the Tg of the cured product obtained by curing the resin composition was measured to be 216° C.

Comparative Example 1

Instead of the resin composition used in Examples 1 to 7, a resin mixture liquid including a bisphenol A-type liquid epoxy resin, butyl glycidyl ether, and m-phenylenediamine/ 4,4'-methylenedianiline as an amine-based curing agent was prepared. By immersing a base body in which the porous ceramic portion had a porosity of 30% by volume in the resin mixture liquid, the pores were filled with the resin, and thermal curing was performed at 180° C. Plating treatment was performed as in Examples 1 to 7, and thus a coil component was produced. Table 1 shows the porosity of the porous ceramic portion and the filling factor of the cured product in the resulting coil component.

TABLE 1

|  | Porosity of porous ceramic portion (vol %) | Filling factor of cured product (vol %) |
|---|---|---|
| Example 1 | 10 | 75 |
| Example 2 | 30 | 30 |
| Example 3 | 30 | 51 |
| Example 4 | 30 | 78 |
| Example 5 | 30 | 88 |
| Example 6 | 50 | 79 |
| Example 7 | 90 | 77 |
| Comparative Example 1 | 30 | 60 |

<Evaluation of Flexural Strength after Exposure to High Temperatures>

The coil components obtained in Example 4 and Comparative Example 1 were each left to stand in a temperature chamber PH-202 manufactured by ESPEC Corp. set at 150° C. or 175° C. and taken out after 3,000 hours. Then, flexural strength was measured using a three-point bending tester.

Figure 4:
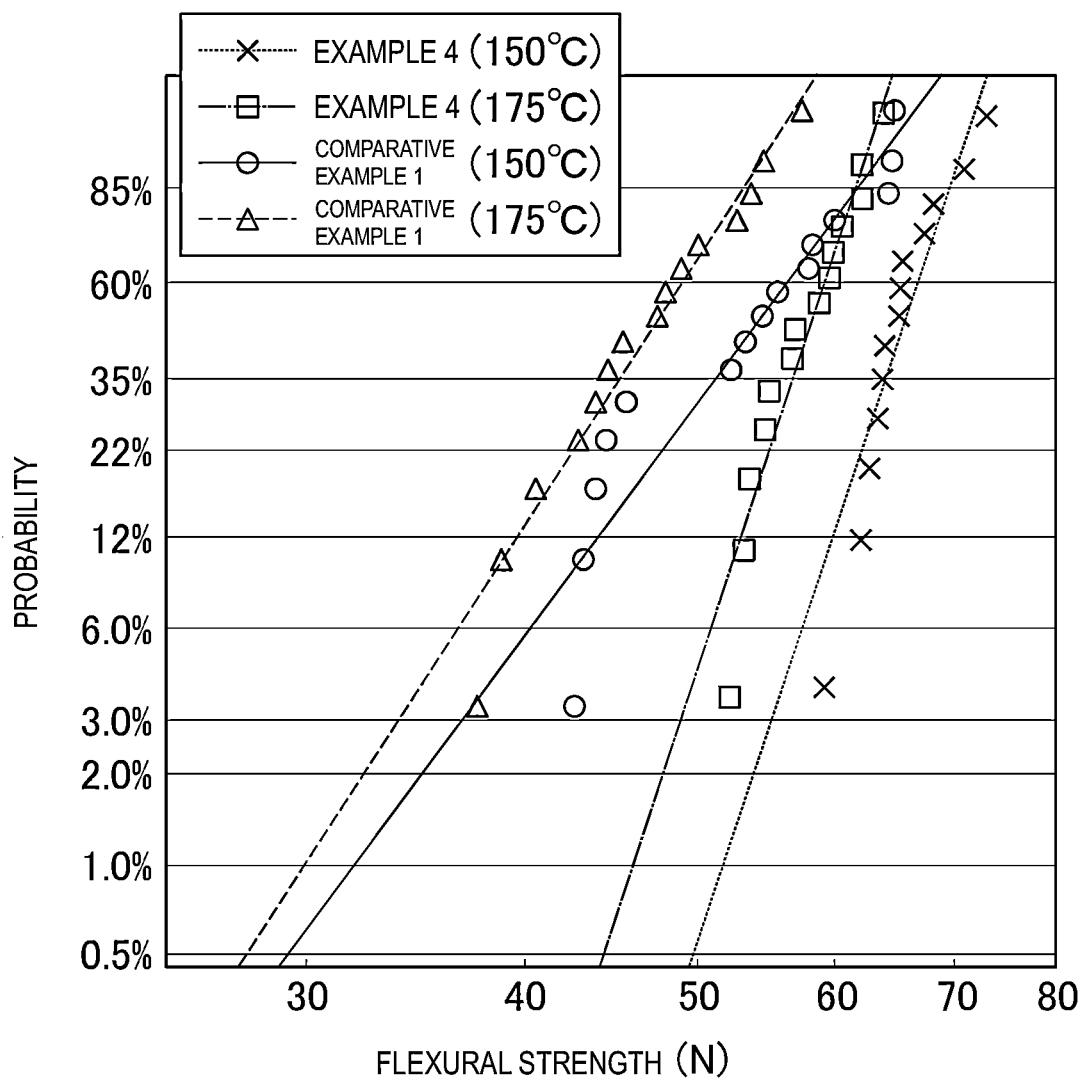
FIG. 4 is a graph showing the Weibull distribution of flexural strength for coil components produced in Example 4 and Comparative Example 1, determined after exposure to high temperatures for 3,000 hours.

FIG. 4 is a graph showing the Weibull distribution of flexural strength for the coil components produced in Example 4 and Comparative Example 1, determined after exposure to high temperatures for 3,000 hours. Furthermore, Table 2 shows the values of flexural strength at which the probability (F (t)) obtained from the Weibull distribution shown in FIG. 4 is 1.0%. F (t) represents unreliability, and an F (t) of 1.0% means a reliability of 99.0%.

TABLE 2

|  | Exposure temperature (° C.) | Flexural strength (N) |
|---|---|---|
| Example 4 | 150 | 51 |
|  | 175 | 47 |

TABLE 2-continued

|  | Exposure temperature (° C.) | Flexural strength (N) |
|---|---|---|
| Comparative Example 1 | 150 | 32 |
|  | 175 | 30 |

In the case of the exposure temperature of 150° C., the flexural strength at which the probability is 1.0% was 32 N in Comparative Example 1 while it was 51 N in Example 4, which was an improvement of about 60%. This trend was the same under the condition of 175° C. The reason for this is considered to be that since the cycloaliphatic epoxy resin has many cyclic structures having high rigidity in the cross-linked structure of the cured product, the thermal motion of the molecular chain is smaller than that of the bisphenol A-type epoxy resin, and molecular chain scission by active oxygen is not likely to occur. The less likelihood of occurrence of thermal motion of the cycloaliphatic epoxy resin is also obvious from the fact that the glass-transition temperature of the cured product is about 216° C., which is higher than the glass-transition temperature (around 150° C.) of the bisphenol A-type epoxy.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for manufacturing a coil component comprising:
    preparing ceramic green sheets containing a ceramic material and a vanishing material;
    forming interconnection layers on the ceramic green sheets;
    stacking the ceramic green sheets having the interconnection layers formed thereon to produce a green multilayer body;
    firing the green multilayer body and eliminating the vanishing material to produce a multilayer body including a porous ceramic portion having pores; and
    filling the pores of the porous ceramic portion with a resin composition containing a cycloaliphatic epoxy resin and an acid anhydride-based curing agent.

2. The method for manufacturing a coil component according to claim 1, further comprising:
    applying a conductive paste onto an outer surface of the multilayer body and baking the conductive paste to form outer electrodes, and
    wherein the filling of the pores with the resin composition is performed after the applying of the conductive paste.

3. The method for manufacturing a coil component according to claim 1, further comprising:
    forming outer electrodes on an outer surface of the porous ceramic portion after the filling of the pores of the porous ceramic portion with the resin composition.

* * * * *